United States Patent [19]

Goldberg

[11] Patent Number: 4,607,332
[45] Date of Patent: Aug. 19, 1986

[54] DYNAMIC ALTERATION OF FIRMWARE PROGRAMS IN READ-ONLY MEMORY BASED SYSTEMS

[75] Inventor: Edward S. Goldberg, North Woodmere, N.Y.

[73] Assignee: AT&T Bell Laboratories, Murray Hill, N.J.

[21] Appl. No.: 457,974

[22] Filed: Jan. 14, 1983

[51] Int. Cl.[4] ............................................. G06F 13/00
[52] U.S. Cl. ..................................... 364/300; 364/900
[58] Field of Search ... 364/200 MS File, 900 MS File, 364/300

[56] References Cited

U.S. PATENT DOCUMENTS

| | | | |
|---|---|---|---|
| 4,093,982 | 6/1978 | Heuer et al. | 364/200 |
| 4,153,933 | 5/1979 | Blume et al. | 364/200 |
| 4,215,400 | 7/1980 | Denko | 364/200 |
| 4,442,486 | 4/1984 | Mayer | 364/200 |
| 4,450,519 | 5/1984 | Guttag et al. | 364/200 |

Primary Examiner—David Y. Eng
Attorney, Agent, or Firm—John T. Peoples; Robert O. Nimtz

[57] ABSTRACT

A method for dynamically altering Read-Only Memory (ROM)-based programs utilizes Random-Access Memory (RAM) and standard processor linkages associated with subroutine or function calls. Each original ROM program includes a statement to call a ROM processing routine. If information passed to the processing routine by the original routine indicates a RAM-based replacement routine is to be executed for the original routine, the processing routine (i) restores the processor to its state immediately following the call to the processing routine, and (ii) branches directly to the replacement routine at a location provided by a RAM-based data structure.

7 Claims, 1 Drawing Figure

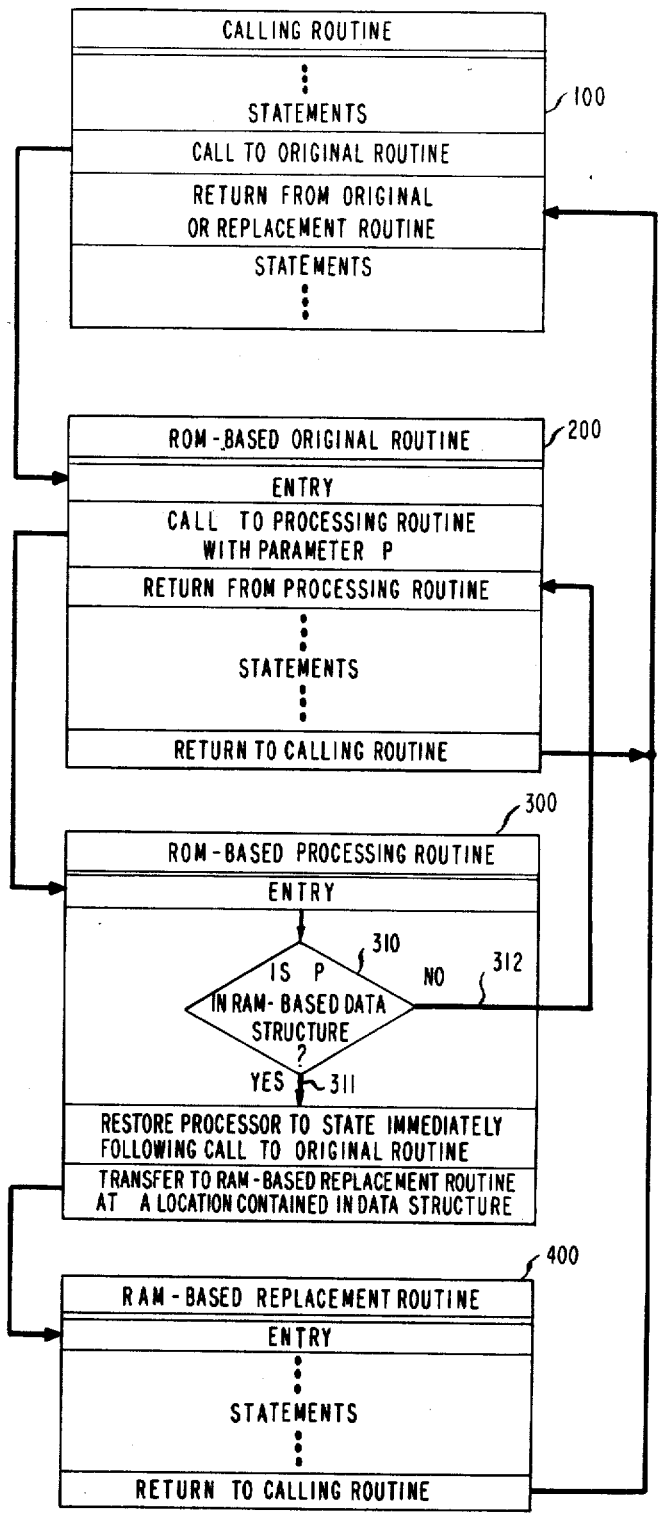
FIG.

DYNAMIC ALTERATION OF FIRMWARE PROGRAMS IN READ-ONLY MEMORY BASED SYSTEMS

FIELD OF THE INVENTION

This invention relates generally to a method for programming a digital computer and, more particularly, to a method of dynamically altering firmware programs during execution of these programs.

BACKGROUND OF THE INVENTION

A Read-Only Memory (ROM) is often used to store programs for computers, especially in microcomputer systems. The ROM is particularly useful since the programs are retained during power outages and may not be overwritten by programming errors. However, when one or more programs require change or updating, the conventional approach is to provide and then install a complete new ROM. The expense of such a change may be large, especially in a distributed processing system which incorporates remotely located computers, so errors generally have been corrected only when economically feasible or when they become deleterious to system operation. The present invention obviates these changes if the microcomputer system is configured with Random-Access Memory (RAM) and each ROM based program includes a test to determine if any ROM program is to be replaced by a RAM program. The following background discussion describes the standard subroutine or function linkages exploited by the present invention to effect such a test.

In certain high-level languages exemplified, for instance, by FORTRAN or C, the sequence of operations on a call to a subroutine or function from a calling routine is an essential part of the particular language. This is required since other processes, such as the loader or assembler associated with the system implementing the language, must interface with the language and its calling sequence. For example, because of this well-defined sequence of operations, a called subroutine need not be compiled at the same time as the calling routine. When the compiler processes a subroutine, one of its operations involves the allocation of storage for local variables. Typically each of these variables is stored in a memory area designated as a stack space or simply, stack, so space may be allocated by adjusting the stack pointer. Moreover, the contents of the stack upon entry to a subroutine are saved so that the stack may be restored to its original state upon exiting the called routine.

These programming properties, in combination with systems employing RAM, may be utilized to change or update ROM programs at system execution time.

SUMMARY OF THE INVENTION

The method in accordance with the present invention allows for dynamic alteration of ROM programs with the aid of Random-Access Memory (RAM) and through the use of the standard linkages associated with subroutine calls in the system processor. When each ROM-based routine is written, one program statement is a call to a ROM-located processing routine which searches a RAM-located data structure. If there exists a correspondence between information passed on the call to the processing routine and certain elements of the data structure, a RAM-based program is substituted for the ROM-based program. After adjusting the processor to the states just after the call to the ROM-based program, the processing routine effects a transfer to the replacement routine in RAM. The location of this replacement routine is also found in the data structure.

One feature of the present invention is the online, real-time substitution of one program for another. Moreover, this is accomplished without requiring memory boundary alignment which is typical of hardware related modifications to run-time software.

The organization and operation of this invention will be better understood from a consideration of the detailed description of the illustrative embodiment thereof, which follows, when taken in conjunction with the accompanying drawing.

BRIEF DESCRIPTION OF THE DRAWING

The sole FIGURE is a combined block diagram and flow diagram depicting the dynamic alteration method in accordance with the present invention.

DETAILED DESCRIPTION

With reference to the FIGURE, this combined block and flow diagram illustrates the general principles of the present invention. In particular, calling routine 100 comprises statements specifying the actual computing operations to be performed. In the C language, one example of calling routine 100 is the special routine or function called "main", which typically invokes other functions to perform its overall task.

Embedded within routine 100 is a call to another routine, which is designated the original routine and is depicted by block 200. Original routine 200 is a ROM-based routine that is representative of any program which may be replaced at run time because of improvements to or errors in routine 200. Immediately after entry into original routine 200, a transfer to processing routine 300 is effected. This transfer occurs via a subroutine or function call, and a parameter, designated P, is passed as an argument on the call. The parameter is utilized by processing routine 300 to determine if this particular original routine is to be replaced. Typically, P represents the starting address of original routine 200.

Processing routine 300 is also a ROM-based routine implementing three basic steps. Upon entry into routine 300, a test is effected to determine if the parameter P is in a RAM-based data structure. This test step is depicted by decision block 310 in the FIGURE. The data structure contains elements representative of the original routines that are to be replaced. For instance, one type of element is the starting address of each original routine requiring substitution. In any case, if there exists a correspondence between P and certain elements of the data structure, branch 311 is followed. Otherwise, branch 312 is taken to effect a transfer back to statements immediately following the call to processing routine 300 from original routine 200.

If branch 311 is selected, the next step, depicted by block 320, is that of restoring the stack pointer and any other machine state registers to the state immediately following the call to original routine 200. In this manner, all traces of the call to routine 200 are removed so that it appears as if the replacement routine was called directly. Because original routine 200 is now transparent to system operation, there is no need to preserve information on the stack relating to the return address of original routine 200.

The final step, represented by transfer block 330 in the FIGURE, is a branch to replacement routine 400. Processing routine 300 does not initiate a call to accomplish this transfer, but rather jumps directly into replacement routine 400. This is accomplished by associating another set of elements in the data structure with replacement routine information. For instance, if P is an address and one part of the data structure may contain the starting address of an original routine 200, then another, corresponding part of the data structure may contain the starting address of the replacement routine 400.

Both the data structure and the replacement routines may be loaded at system initialization or they may be downloaded from a system controller during system operation. With this latter technique, replacement routines may be dynamically changed so that if RAM space is limited, the most important replacement routines may overwrite less important replacement routines at appropriate times.

The foregoing discussion described the present invention in a general way. The following discussion presents an example utilizing the C language. A simple original routine 200 is represented as follows:

```
f(x)
int x;
    {int i;
    i=2*x*x;
    return(i);
    }
```

The above subroutine, called 'f', which computes twice the square of the value x, could be compiled and placed into ROM. However, to allow a change in this routine at some future time, only one additional statement is required:

```
f(x)
int x;
    {int i;
    trap_door(f);
    i=2*x*x;
    return(i);
    }
```

The call to the processing routine 'trap_door' includes a parameter which is the address of the subroutine 'f'. In 'trap_door', a check is made as to whether 'f' is to be run as it was placed into ROM (trap door closed) or whether a RAM-based function is to be run (trap door open). If the ROM-based version of 'f' is to be run, 'trap_door' simply returns to original routine 'f'. Otherwise, an address in the RAM-based version of the function is found and a branch to that address occurs.

A simple data structure for implementing 'trap_door' is the NULL terminated linear list. The list is searched and if the address of 'f' is found in the list, then a replacement routine is executed in place of 'f'. The data structure may have the representation:

```
struct entry{
    int *romf();
    int *ramf();
    }list [MAX_FUNCTS_TO BE_SWITCHED + 1];
    /*the +1 is for a NULL terminator*/
One version of 'trap_door' becomes:
trap_door(f)
```

```
int *f();
    {struct entry *this;
    extern struct entry list[];
    for(this=&list[0];this->romf!=NULL;++this){
        if(this->romf==f){
            jump_to(this->ramf);
        }
    }
    return;
    }
```

The function called 'jump_to', for efficiency purposes, is written in machine or assembly language once the compiler implementation is known. This function computes the correct address to branch to in RAM. If the results of such a calculation are loaded into the 'list' table initially, then the 'jump_to' function is simplified. Also, before the branch, 'jump_to' restores the stack and other state information to the state immediately after the call to 'f'. This may be accomplished by storing the stack pointer of the desired state in memory and setting the stack pointer to the stored value prior to the jump to the replacement routine.

Finally, for those systems which expect to have a large number of ROM functions switched to RAM versions, some data structure other than a linear list with low-to-high list search may be preferable. For instance, a binary search may be one technique that may be deployed.

It is to be further understood that the methodology described herein is not limited to the specific forms disclosed by way of illustration, but may assume other embodiments limited only by the scope of the appended claims.

What is claimed is:

1. A method for selecting between an original routine and a replacement routing and for executing the selected routine in a processor having a calling routine and a processing routine, said method comprising the steps of (1) after each call to said original routine by said calling routine, branching to said processing routine, (2) comparing a predetermined address associated with said original routine to an address list accessible by said processing routine, (3) if said predetermined address appears in said list, proceeding to step (4); otherwise, returning to said original routine, (4) restoring said processor to its state immediately following each call to said original routine, and (5) branching to said replacement routine from said processing routine.

2. The method as recited in claim 1 wherein said step (1) of transferring includes the step of calling said processing routine as the first executable instruction in said original routine.

3. The method as recited in claim 2 wherein said step (4) of restoring includes moving a stack pointer of said processor to the return address of said calling routine.

4. The method as recited in claim 2 wherein said address list includes the starting address of said replacement routine and said step (5) of branching includes the steps of fetching and transferring to said starting address.

5. The method as recited in claim 2 wherein said address list is arranged in a preselected order and said step (2) of comparing includes the steps of subtracting said predetermined address from each said address on said list, starting with the first address and, for a result of zero, indicating the appearance of said predetermined address on said list.

6. The method as recited in claim 5 wherein said preselected order is an ascending order, said predetermined address is the starting address of said original routine and said first address is the lowest address.

7. In a data processing system comprising: a read-only storage medium for storing original routines and a processing routine; a random-access storage medium for storing a replacement routine, if any, for each of said original routines; said processing routine having access to said random-access memory which also stores a list of predetermined addresses for each of said original routines having a corresponding replacement routine; and a processor for executing said routines, a method for determining, after each of said original routines is called by said processor, whether to execute said each of said original routines or said corresponding replacement routine, and for executing the appropriately selected routine, said method comprising the steps of (i) transferring to said processing routine with the predetermined address associated with said each of said original routines, (ii) comparing said predetermined address with each of said predetermined addresses in said list, (iii) upon a match in step (ii), proceeding to step (iv); otherwise, returning to said each of said original routines, (iv) restoring said processor to its state immediately following said call to said each of said original routines, and (v) branching to the starting address of said replacement routine corresponding to said each of said original routines.

* * * * *